Dec. 30, 1969  E. O. SCHONSTEDT  3,487,459
INDUCED MAGNETIC COMPENSATION FOR MISALIGNMENT OF
MAGNETIC GRADIOMETER SENSORS
Filed March 28, 1968
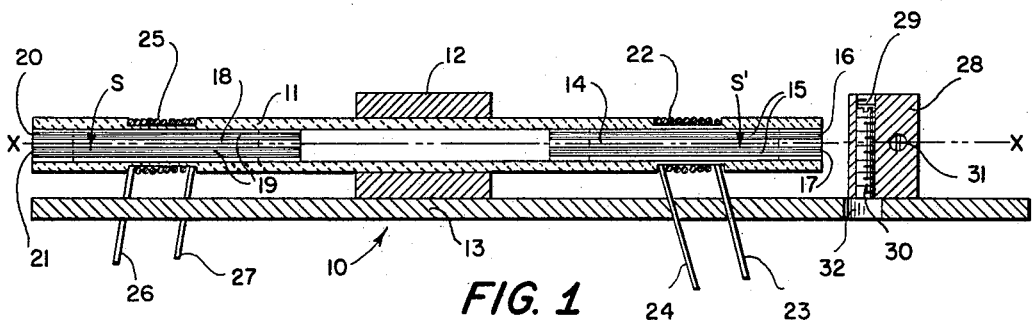
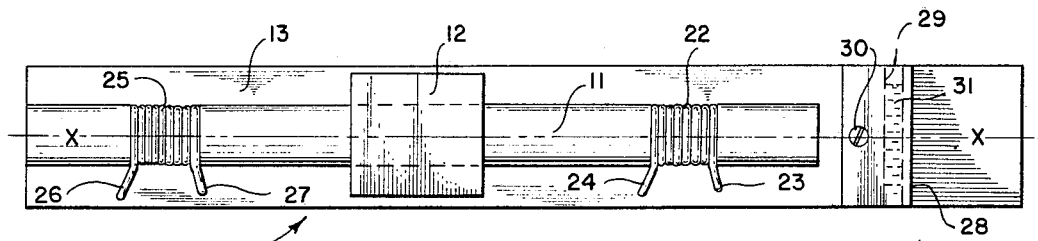
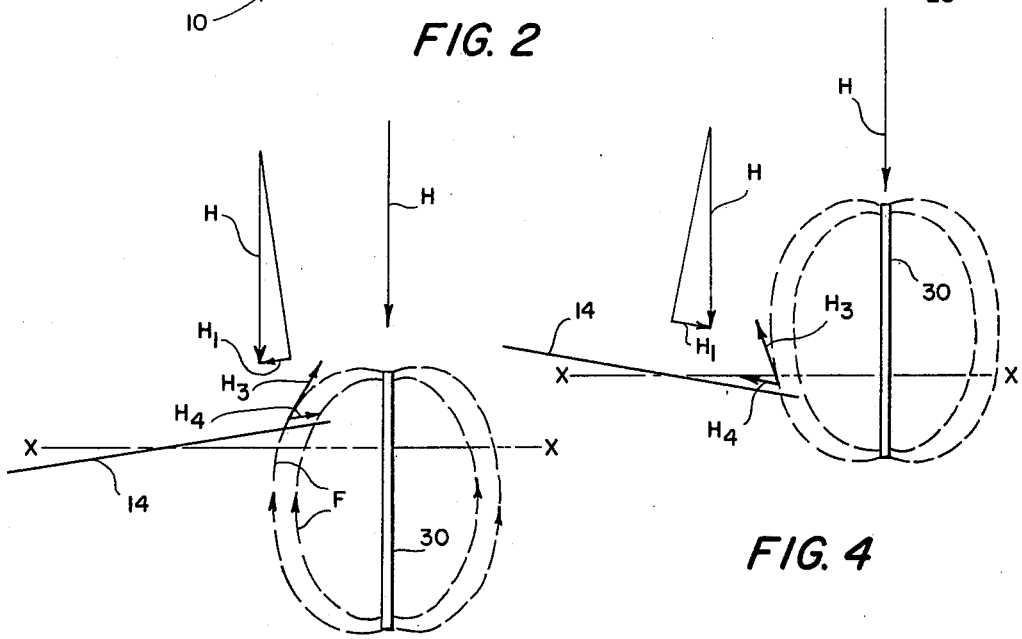
INVENTOR
ERICK O. SCHONSTEDT
BY
ATTORNEY United States Patent Office 3,487,459
Patented Dec. 30, 1969

3,487,459
INDUCED MAGNETIC COMPENSATION FOR MIS-
ALIGNMENT OF MAGNETIC GRADIOMETER
SENSORS
Erick O. Schonstedt, Silver Spring, Md.
(1604 Greenbrier Court, Reston, Va. 22070)
Filed Mar. 28, 1968, Ser. No. 716,851
Int. Cl. G01r 33/02
U.S. Cl. 324—43
2 Claims

ABSTRACT OF THE DISCLOSURE

Compensation for misalignment of magnetic gradiometer sensors is provided by a pair of magnetic screws adjustable along perpendicular axes.

BACKGROUND OF THE INVENTION

This invention relates to apparatus for measuring or sensing magnetic fields or disturbances and more particularly to a magnetic gradiometer incorporating mechanically adjustable magnetic compensation for misalignment of the axes of the magnetic field sensing elements.

Saturable core (fluxgate) magnetic gradiometers are comprised of at least two electrically matched field-sensing elements mounted on a non-magnetic structure such that their magnetic axes are, theoretically, precisely parallel or coaxial. The output signals of the two sensors are arranged such that they oppose each other. If the structure is oriented in any direction in a uniform magnetic field, the components of magnetic field existing at each sensor are equal, so that there is no resulting output signal from the combination of the two sensors.

If a magnetic object exists within the detection range of the instrument, the magnetic field will generally be stronger at one of the sensors than at the other sensor. As a result, the output signal of one sensor will be greater than that of the other, so a net difference signal will be produced that is indicative of the presence of the object.

For accuracy of operation the magnetic axes of the two sensors must be precisely aligned. The precision required is of the order of three seconds of arc if the error signal due to misalignment of the magnetic axes is to be less than one gamma ($10^{-5}$ gauss) in an ambient magnetic field of 60,000 gammas. If the magnetic axes of the two sensors are not precisely aligned, the component of the ambient magnetic field existing along the magnetic axis of one sensor will not be the same as the component of the magnetic field existing along the magnetic axis of the other sensor. The difference between the two sensor signals will not be zero, and a false signal will be obtained due to the mechanical misalignment.

In prior art fluxgate gradiometers alignment has been achieved by mechanical adjustment or bending of structural members, such as a tube in which the sensors are mounted. See, for example, the applicant's prior Patent No. 3,050,679, issued Aug. 21, 1962. The bending of the tube places the tube under stress. In time, the stress may be relieved and the sensors may become misaligned, resulting in inaccuracy and the need for readjustment.

The applicant's copending application, Ser. No. 520,105, filed Jan. 12, 1966, discloses a system by which compensation for misalignment is produced electrically. While this system is capable of compensating for misalignment with high precision, its cost may be higher than is justified when such high accuracy is not required.

It has heretofore been proposed to provide bodies of easily magnetizable material adjacent to gradiometers for compensating for extraneous magnetic effects and misaligned cores. However, the bodies have been capable of minimal adjustment, and such prior gradiometers have had limited compensation flexibility.

BRIEF SUMMARY OF THE INVENTION

It is accordingly a principal object of the present invention to provide simplified, yet highly versatile apparatus for compensating for sensor misalignment in a magnetic gradiometer or the like.

Another object of the invention is to provide apparatus of the foregoing type in which the compensation is magnetic and the compensation adjustment is entirely mechanical, but in which there is no stressing of a support structure.

Yet another object of the invention is to provide compensation elements of nominal fixed size, the positions of which are easily adjusted and readjusted.

A further object of the invention is to provide compensation in two orthogonal planes, in either or both of which the compensating elements may be placed in a neutral position when compensation is necessary.

Briefly stated, the present invention is based upon the concept of providing bodies of easily magnetizable material adjacent to the gradiometer structure which are adjustable along axes perpendicular to the axis of the gradiometer. Each body which has a length significantly greater than its diameter (or width) is adjustable between a position in which the body is predominantly at one side of the gradiometer axis and a position in which the body is predominantly at the opposite side of the gradiometer axis. Two magnetic bodies which are adjustable along axes mutually orthogonal to each other and to the gradiometer axis suffice to provide the desired compensation.

BRIEF DESCRIPTION OF THE DRAWINGS

The foregoing and other objects, advantages, and features of the invention, and the manner in which the same are accomplished will become more readily apparent upon consideration of the following detailed description of the invention taken in conjunction with the accompanying drawings, which illustrate a preferred and exemplary embodiment, and wherein;

FIGURE 1 is a longitudinal sectional view illustrating the construction of a magnetic gradiometer employing compensation in accordance with the invention;

FIGURE 2 is a plan view of the apparatus of FIGURE 1; and

FIGURES 3 and 4 are diagrams illustrating the manner in which the invention provides compensation.

DETAILED DESCRIPTION OF THE INVENTION

Referring to FIGURES 1 and 2, reference numeral 10 designates generally the sensor mount of a magnet gradiometer, the mount comprising a tube 11 of ceramic or other non-magnetic material supported at its center by a block 12 secured to a base 13, both the block and the base being of non-magnetic material also. The sensors S and S' may be of the fluxgate type, such as the sensors disclosed in the applicant's prior patent, No. 2,981,885, issued Apr. 25, 1961, or may be any other appropriate type. The details of the sensors are not part of the present invention, but for illustrative purposes it may be assumed that each sensor has a tubular magnetic core 14 or 18, which may be of the type mounted on a ceramic tube to which nylon ferrules are attached at each end. Wound longitudinally around core 14 are excitation windings 15 which have ends 16 and 17. Similarly, excitation windings 19 wound about core 18 have ends 20 and 21. Signal pickup windings 22 and 25 are shown wound circumferentially about the cores in notches in the tube 11 and have ends 23, 24 and 26, 27, respectively. In operation the excitation windings 15 and 19 are supplied with alternating current by an oscillator. Second harmonic fluxes generated in the cores due to the effect of an external magnetic field acting along the core axes (parallel to the length of the cores) cut the pickup windings 22 and 25 and generate second harmonic output voltages therein. The output voltages from the sensors S and S′ are applied differentially to suitable measuring apparatus, such as an AC voltmeter, so that if the sensors are matched and their axes are prefectly aligned, the meter will read zero in a uniform field. If, however, there is misalignment of one of the core axes with respect to the axis X—X of the gradiometer, an error signal will be generated due to the misalignment.

In accordance with the invention, compensation for misalignment is provided by adjustable bodies of easily magnetizable material. In the form shown, a rectangular block 28 of non-magnetic material is fixed to the base 13 adjacent to one end of the gradiometer support tube 11 and is provided with two tapped holes 29 which are perpendicular to each other and which are perpendicular to the axis X—X of the gradiometer. In the holes are threaded, elongated, permeable, magnetic screws or threaded rods 30 and 31 of a material such as Permalloy. Each screw has a notch at one or both ends so that it may be turned in either direction by a screwdriver into or out of its associated bore, for movement between a position at which the screw is predominantly at one side of the axis X—X or predominantly at the opposite side of the said axis. The screws may also be placed in neutral positions at which each screw provides magnetic material disposed equally at opposite sides of the axis X—X. An opening 32 is provided in the base 13 to permit a full range of adjustment of the screw 30.

To adjust the compensating mechanism of the invention, the assembly 10 is placed in a fixture (not shown) so that it can be rotated about axis X—X in an ambient magnetic field perpendicular to that axis. If the axes of the core assemblies 14 and 18 are not precisely aligned with or parallel to axis X—X, then a signal will be generated when the assembly is turned about axis X—X. The signal generated because of misalignment of a core in the plane containing axis X—X and screw 30 can be minimized by adjusting the position of screw 30 in its bore 29 relative to axis X—X. Similarly, any misalignment in the plane containing axis X—X and screw 31 can be minimized by adjusting the position of screw 31 in its bore 29 relative to axis X—X.

The theoretical basis for the compensating apparatus of the invention is illustrated in FIGURES 3 and 4. In FIGURE 3 the core 14, for example, is shown misaligned with axis X—X. The ambient magnetic field vector H is shown perpendicular to axis X—X. Due to the misalignment of the core, there will be an ambient magnetic field vector $H_1$ parallel with the axis of the core, which will produce a signal in the core pick-up winding because of the mechanical misalignment of the core. The magnetic field H also acts on screw 30 to magnetize the screw so as to produce external magnetic lines of force having the directions indicated by the arrows on the lines F. This external field acting on the core may be represented by vector $H_3$. Vector $H_3$ has a component $H_4$ parallel with the core. The position of screw 30 is adjusted so that $H_4$ is equal in magnitude to $H_1$ but in the opposite direction, thereby to cancel $H_1$. Thus, the field induced in screw 30 by the ambient field perpendicular to axis X—X produces the compensation.

FIGURE 4 shows the condition when the whole assembly is rotated 180 degrees. It can be seen that the compensation is still provided, because $H_1$ and $H_4$ both reverse their direction when the assembly is turned 180 degrees. A similar type of compensation is provided by screw 31 in a plane orthogonal to the plane illustrated in FIGURES 3 and 4. It is apparent that by adjustment of the screws, both the magnitude and the polarity of the compensating fields can be adjusted so as to balance out the fields induced in the cores of the sensors due to the misalignment, the magnitude of the compensating field being determined by the distance of the center of a screw from axis X—X and the polarity by positioning the center of hte screw at one side of axis X—X or the opposite side. By virtue of the orthogonal relationship of screws 30 and 31 compensation is provided in orthogonal planes, so that substantially complete compensation can be provided. If both cores are misaligned, any net error signal can be balanced out.

The apparatus of the invention is much simpler than comparable apparatus known heretofore and has additional advantage of permitting the compensation screws to remain in place, in a neutral (centered) position, when there is no misalignment of the cores. Although the bores 29 for the screws do not actually intersect, in order to permit free passage of the screws across axis X—X (which does intersect the screw axes), the screw axes are nevertheless, perpendicular or orthogonal within the general meaning of such terms.

Any tendency for the magnetic field of the screws to interact with each other can be eliminated by placing one screw at one end of the structure (adjacent S) and the other screw at the other end of the structure (adjacent S′).

The invention claimed is:

1. A magnetic gradiometer or the like comprising a pair of fluxgate directional magnetic field sensors having magnetic cores and located in spaced relation along a predetermined axis and having their individual magnetic axes approximately aligned with said predetermned axis, said sensors being firmly attached to a rigid non-magnetic support, and means for compensating for misalignment of either of said sensors with said predetermined axis, said means comprising a pair of bodies of easily magnetizable material located adjacent to said sensors, and means for supporting said bodies for adjustment along axes which are perpendicular to each other and to said predetermined axis, the last-mentioned means comprising a block of non-magnetic material mounted adjacent to one end of said support for said sensors separate from the cores thereof, said bodies being threaded into said block.

2. A magnetic gradiometer or the like in accordance with claim 1, said block having passages in which said bodies are supported for movement across the said predetermined axis.

References Cited

UNITED STATES PATENTS 2,966,853   1/1961   Gilfillan et al. _____ 324—43 XR

ALFRED E. SMITH, Primary Examiner